June 14, 1960 K. RUOFF ET AL 2,940,321
CHANGE-SPEED TRANSMISSION
Filed June 26, 1958
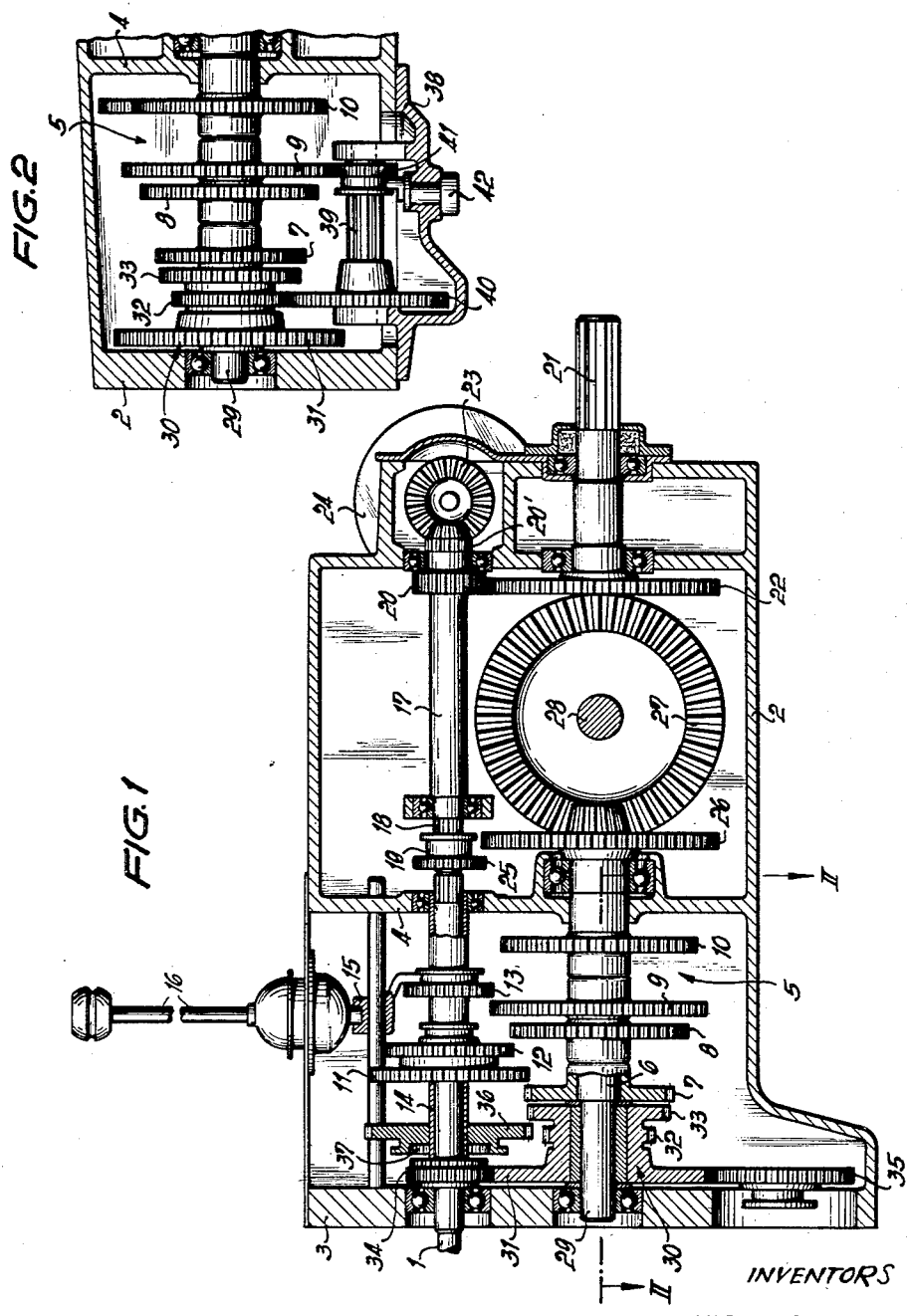
INVENTORS
KARL RUOFF
WALTER EBERLE
BY Dicke and Craig
ATTORNEYS

United States Patent Office 2,940,321
Patented June 14, 1960

2,940,321

CHANGE-SPEED TRANSMISSION

Karl Ruoff, Kirchheim (Teck), and Walter Eberle, Goeppingen, Germany, assignors to Firma Dr. Ing. h.c. F. Porsche K.G., Stuttgart-Zuffenhausen, Germany Filed June 26, 1958, Ser. No. 744,762

Claims priority, application Germany July 17, 1957

19 Claims. (Cl. 74—15.2)

The present invention relates to a tractor, especially to an agricultural tractor with a change-speed transmission which includes a two-step change-speed gear, a slow or creeping speed, a mowing drive and a separate output coupling shaft which is selectivley driven either at a constant speed proportional to the engine speed or in dependence on the speed of the vehicle over one of the two steps or speeds of the change-speed transmission.

In the known construcitons of this type of the prior art, the drive for the slow or creeping speed, the mowing drive and the drive for the change-speed gear are usually taken off at different places within the change-speed transmission.

Furthermore, change-speed transmissions are known in the prior art in which a multi-step or multi-speed shiftable gear set from which all of the main and auxiliary drives are taken off is connected ahead of the main change-speed transmission.

The first-mentioned construction of the prior art involves a complicated and intricate construction made of many parts and including numerous relatively expensive bearing points, whereas in the last-mentioned construction of the prior art which is characterized by a self-contained, complete transmission with a housing of its own, the manufacture is relatively expensive and results also in an enlargement of the tractor by reason of the spatial requirements thereof.

It has also been proposed already in the prior art for purposes of providing a drive for the slow or creeping speed, to arrange a planetary gear set on the countershaft and to drive therefrom simultaneously the output coupling shaft. By the use of such an arrangement, the space requirement for the drive is kept relatively small, however, the planetary gear set makes high demands insofar as accuracy and tolerances in the manufacture and machining thereof are concerned, and is not sufficiently sturdy in the dimensions thereof dictated by other factors to satisfy the load requirements which are made of a tractor, and especially of an agricultural tractor.

According to the present invention, these disadvantages of the prior art are avoided in that a gear set is connected within the transmission housing ahead of the multi-step or multi-speed main change-speed transmission whereby some of the different transmission ratios or speeds, the slow or creeping speed and the mowing drive are taken off from this gear set.

By the use of a construction in accordance with the present invention, a structurally relatively simple transmission assembly may be obtained which assures a simple and engineering-wise efficient manufacture and assembly, and which furthermore excels by a relatively slight space requirement. Additional transmission parts as well as special bearings and the close tolerances and high accuracy fits necessary therefor are obviated by the use of the present invention if the gear set is rotatably supported on the extended shaft portion of the transmission output or driven shaft. The gear set is formed by toothed gear wheels of different speeds or transmission ratios, whereby the gear wheel with the highest transmission ratio meshes constantly with the gear wheel of the drive or input shaft and simultaneously therewith operatively engages the driving gear for the mowing drive.

A structurally most favorable arrangement may be obtained in accordance with the present invention if the driving gear for the slow or creeping speed is arranged between the gear wheel with the largest speed reduction ratio and the gear wheel of one of the paths of power flow for the change-speed transmission, namely the one including the speed reduction gear set. The slow or creeping speed of the tractor is constituted by a shiftable gear set, connected ahead of the main change-speed transmission, which is in continuous meshing engagement and which is flangedly connected to the transmission housing in a detachable manner. Furthermore, the gear wheel of the speed-reduction gear set is coordinated to a shifting gear which is displaceably mounted on the countershaft and which may be selectively brought into operative engagement with the gear wheel of the drive or input shaft or with the speed-reduction gear set of change-speed transmission.

Accordingly, it is an object of the present invention to provide a change-speed gear for tractors which is simple in construction, relatively inexpensive in manufacture and which offers compactness and relatively slight space requirement.

Another object of the present invention is to provide a change-speed transmission, particularly for agricultural tractors, in which very favorable spatial conditions prevail and in which the total number of necessary bearings is limited as much as possible.

Another object of the present invention is the provision of a change-speed transmission for a tractor which is sturdy notwithstanding the limitation of its size.

Still another object of the present invention is the provision of a change-speed transmission for agricultural tractors which eliminates the necessity for close tolerances of at least certain parts and thereby facilitates machining and assembly thereof.

A further object of the present invention is to provide a change-speed transmission for tractors which has great versatility and provides, in a highly efficient manner, the necessary speeds for the sundry intended uses of the tractor.

These and other objects, features and advantages of the present invention will become more obvious from the following description when taken in connection with the accompanying drawing which shows, for purposes of illustration only, one embodiment in accordance with the present invention and wherein:

Figure 1 is an axial cross-sectional view through a change-speed gear of a tractor provided with a gear set arrangement in accordance with the present invention, and Figure 2 is a cross-sectional view taken along line II—II of Figure 1.

Referring now to the drawing, wherein like reference numerals are used throughout the two views to designate like parts, and more particularly to Figure 1 thereof, reference numeral 1 designates the drive or input shaft of a change-speed transmission which is driven in any suitable manner, for example, over the main disengageable clutch or hydraulic coupling (not shown) from an internal combustion engine (not shown). The drive or input shaft 1 is rotatably supported by means of appropriate bearings in cross or partition walls 3 and 4 of the change-speed gear housing 2. The main change-speed transmission generally designated by reference numeral 5 (Figures 1 and 2) includes a driven or output shaft 6 (Figure 1) which is also supported by means of appropriate bearings in cross or partition walls 3 and 4 of the housing 2. The driven or output shaft 6 is provided with gear wheels 7, 8, 9 and 10 securely mounted thereon for common rotation therewith in any suitable manner, the function and operation of which will be more fully described hereinafter.

The gear wheels 7, 8 and 9, as well as gear wheel 10 which may be connected to a reversing gear in the usual manner, may be brought into meshing engagement with the respective gears 11, 12 and 13 coordinated thereto which are mounted on countershaft 14, for example, by means of a spline connection so as to rotate in unison therewith and also be displaceable in the axial direction thereof by means of a shifting fork 15 actuated in turn by a shifting lever 16.

The countershaft 14 is constructed as a hollow shaft and is rotatably supported on the drive or input shaft 1. An intermediate shaft 17 is arranged coaxially with and in the extension of the drive shaft 1, whereby the intermediate shaft 17 is provided with a spline-groove profile 18 and, by means of coupling or clutching sleeve 19, is adapted to be brought into form-locking engagement with the drive or input shaft 1 also provided with an appropriate spline-groove profile at the right end thereof, as viewed in the drawing. A gear wheel 20 and a bevel gear wheel 20' are mounted or secured at one end of intermediate shaft 17, namely the right end thereof, as viewed in Figure 1. The gear wheel 20 is in continuous meshing engagement with a gear wheel 22 rigidly secured or mounted on the output coupling shaft 21 for common rotation therewith. The bevel gear 20' drives the friction pulley or disk 24 over a bevel gear 23 and the cross shaft on which the bevel gear 23 is mounted. The clutch sleeve 19 carries or is provided with an externally toothed arrangement or gear 25 for purposes of engagement with a gear wheel 26 which is splined to or connected in any other suitable manner with the output or driven shaft 6. The driven shaft 6 forms, in a manner known per se, a bevel gear which drives over spur bevel gear 27 and shaft 28, the wheels (not shown) of the tractor.

At the opposite end of the driven or output shaft 6, i.e., at the left end thereof as viewed in Figure 1, the driven or output shaft 6 is provided with a shaft extension 29 which carries a rotatably supported gear set generally designated by reference numeral 30. The gear set 30 consists of gear wheels 31, 32 and 33 (Figures 1 and 2) of which the gear wheel 31 providing the large speed-reduction ratio is in continuous meshing engagement with the gear wheel 34 of the drive or input shaft 1. The gear wheel 31 further meshes with a gear wheel 35 (Figure 1) providing for the mowing drive which may be a belt drive or the like, for example, taken off from a pulley or the like laterally attached to the gear wheel 35 and disposed in a suitable aperture in housing 2.

A shiftable gear wheel 36 adapted to be displaced axially may be brought into engagement with the gear wheel 33, the gear wheel 36 being supported on the countershaft 14 for common rotation therewith and serving as a change-speed transmission or speed reduction to multiply, i.e., double the number of available transmission ratios 7:11, 8:12 and 9:13. The shiftable gear 36 is also provided with internal gear teeth 37 which are adapted to be clutched to the external teeth of the gear 34 secured to the drive or input shaft 1.

The slow or creeping speed is taken off over the gear wheel 32, intermediate gear wheels 31 and 33 (Figure 2). The slow or creeping speed for the tractor includes a splined shaft 39 (Figure 2) supported in a detachable housing part 38, whereby gear wheel 40 in constant meshing engagement with the gear wheel 32 and displaceable shifting gear 41 are mounted on shaft 39 for common rotation therewith. The shifting gear 41 which is adapted to be engaged and disengaged by means of lever 42 may be brought into operative engagement, if so desired, with the gear wheel 9 of the lowest transmission speed of the main change-speed transmission 5.

*Operation*

The operation of the change-speed transmission in accordance with the present invention is as follows.

If the internal combustion engine is operating and the main clutch (not illustrated) is engaged, then the drive or input shaft 1 rotates at the speed of the engine and therewith also rotates the gear wheel 34 at the same speed since the latter is securely mounted on or formed integrally with the former. Simultaneously therewith, the gear set generally designated by reference numeral 30 is also set into rotation by the gear wheel 31 thereof which constantly meshes with the gear wheel 34 of the driving or input shaft 1 so that the gear set 30 always rotates at a speed proportional to the engine speed. By actuating the creeping speed lever 42 (Figure 2), if so desired, the low or creeping speed may be engaged so that the drive of the wheels of the tractor takes place over the two pairs of meshing gears 32 and 40 and of meshing gears 41 and 9 (Figure 2) respectively each providing a speed reduction. If this slow or creeping speed is engaged, the tractor moves along the ground at the lowest possible speed since the driven or output shaft 6 to which gear wheel 9 is secured rotates at a speed proportional to the double speed reduction of gears 32, 40 and 41, 9.

Simultaneously therewith, the mowing drive may be taken off over the pair of meshing gears 31 and 35 whereby the speed thereof remains always proportional at a predetermined ratio to the engine speed.

The different so-called "agricultural" speeds, i.e., the speeds ordinarily used during agricultural operations, may be selectively engaged as soon as the corresponding transmission ratio of the pair of meshing gears 33 and 36 is brought into operative engagement. After the gear 36 is moved in any suitable conventional manner, for example, by a lever, so as to be in meshing engagement with the gear 33 of gear set 30, the desired forward speed is selected in the main transmission 5 or may be engaged in the usual manner by successively shifting the transmission through the various speeds up to the desired higher or lower speed. These "agricultural" speeds may then be obtained by simply selectively engaging, by means of shifting lever 16, any one of gear wheels 11, 12 and 13 with a respective one of gear wheels 7, 8 and 9 of the output or driven shaft 6 thereby providing the three relatively slow "agricultural" speeds.

For purposes of normal operations, for example, for transporting goods by means of the tractor in which case relatively higher speeds thereof are desirable, the gear set 30 is by-passed and the shiftable gear wheel 36 is clutched with the internal gear teeth 37 thereof directly to the gear wheel 34 of the drive or input shaft 1. By reason of this direct connection between input shaft 1 and countershaft 14, the gear wheels 11, 12 and 13 rotate at the same speed as the internal combustion engine and the three main forward speeds may be selectively engaged by engagement, through operation of lever 16 and therewith of shifting fork 15, of gear wheel 13 with gear wheel 9, or of gear wheel 12 with gear wheel 8, or of gear wheel 11 with gear wheel 7.

If during the prevailing operations, the coupling shaft 21 is to operate at constant rotational speed, then the driver merely has to move the shifting sleeve 19 toward the left as viewed in Figure 1 in any suitable manner whereby the intermediate shaft 17 is operatively connected directly with the drive or input shaft 1 of the transmission so that the coupling shaft 21 rotates at rotational speed having a predetermined ratio with respect to the engine rotational speed determined by the gear reduction of gears 20 and 22 which remains constant. If the shifting sleeve 19 is moved toward the right, then the intermediate shaft 17 is driven over the pair of gears 25 and 26 from the driven or output shaft 6 so that in that case the coupling shaft 21 rotates at a speed corresponding to or depending on the speed of the vehicle.

It is understood that any suitable conventional mechanism or control arrangement of the manual or semi-automatic type with preselection may be provided for shifting the gear wheel 36, the gear wheels 11, 12 and 13, the shifting sleeve 19 and/or the gear 41.

While we have shown and described one preferred embodiment in accordance with the present invention, it is understood that the same is not limited thereto but is susceptible of many changes and modifications within the scope and spirit of the present invention, and we, therefore, intend to cover all such changes and modifications as are encompassed by the scope of the appended claims.

We claim:

1. A change-speed transmission for a tractor having a transmission housing and adapted to provide a plurality of transmission speeds including a creeping speed, a mowing drive and separate output shaft means, comprising input means, main change-speed gear means within said housing, means including gear set means for selectively connecting said input means with said change-speed gear means either directly or at a speed reduction over said gear set means, and means for taking off the drive for said creeping speed and said mowing drive from said gear set means.

2. A change-speed transmission according to claim 1, wherein said gear set means includes a plurality of gear wheels of different size to provide different transmission ratios, a gear wheel rigidly connected with said input means and in constant meshing engagement with the gear wheel of said gear set means providing the largest speed reduction, said mowing drive also including a gear wheel in constant meshing engagement with said last-mentioned gear wheel of said gear set.

3. A change-speed transmission according to claim 2, wherein said gear set includes a gear wheel for driving said creeping speed disposed between said first-mentioned gear wheel and another gear wheel thereof transmitting the drive from said gear set means to said change-speed gear means.

4. A change-speed transmission according to claim 3, wherein said creeping speed includes disengageable countershaft gear means having a gear wheel in constant meshing engagement with one of the gear wheels of said gear set means, and means for detachably connecting said disengageable countershaft means to said transmission housing.

5. A change-speed transmission for a tractor having a transmission housing and adapted to provide a plurality of transmission speeds including a creeping speed, a mowing drive and separate output shaft means, comprising input means, main change-speed gear means within said housing having transmission output means, means including gear set means rotatably mounted on said transmission output means for selectively connecting said input means with said change-speed gear means either directly or at a speed reduction over said gear set means, and means for taking off the drive for said creeping speed and said mowing drive from said gear set means.

6. A change-speed transmission according to claim 5, wherein said gear set means includes a plurality of gear wheels having different diameter, and means including one of said last-mentioned gear wheels for connecting said input means with said gear set means to provide a speed reduction.

7. A change-speed transmission according to claim 6, wherein said creeping speed includes detachable speed-reducing means operatively connected between said gear set means and said change-speed gear means.

8. A change-speed transmission for a tractor having a transmission housing and adapted to provide a plurality of transmission ratios including a creeping speed, a mowing drive and separate output shaft means, comprising input means, main change-speed gear means within said housing, means including gear set means and countershaft gear means in said change-speed gear means for selectively connecting said input means with said change-speed gear means either directly or at a speed reduction over said gear set means and said countershaft gear means, and means for taking off the drive for said creeping speed and said mowing drive from said gear set means.

9. A change-speed transmission according to claim 8, wherein said gear set means includes a plurality of gear wheels, and wherein said countershaft gear means includes an axially displaceable gear wheel, and shifting means for selectively and operatively connecting said axially displaceable gear wheel either with one of the gear wheels of said gear set means or directly with said input means.

10. A change-speed transmission according to claim 9, further comprising means for selectively connecting said output shaft means to said input means or to said transmission output means.

11. A change-speed transmission according to claim 10, wherein said creeping speed includes countershaft gear means operatively connected between said gear set means and said change-speed gear means, and means for selectively connecting said countershaft gear means with one of said gear set means and change-speed gear means.

12. A change-speed transmission according to claim 11, further comprising means for detachably connecting said countershaft gear means to said housing.

13. A change-speed transmission for a tractor having a transmission housing and adapted to provide a plurality of transmission ratios including a creeping speed, a mowing drive and separate output means, comprising input means, main change-speed gear means within said housing including a countershaft, an output shaft, and a plurality of selectively engageable transmission ratios for operatively connecting said countershaft to said transmission output shaft, means including gear set means for selectively connecting said input means either with said change-speed gear means either directly or at a speed reduction over said gear set means, and drive means for taking off the drive for said creeping speed and said mowing drive from said gear set means.

14. A change-speed transmission according to claim 13, wherein said gear set means is rotatably mounted on said transmission output shaft.

15. A change-speed transmission according to claim 14, wherein said drive means includes an additional shaft operatively connected with said separate output means, and means for selectively connecting said additional shaft with said input means or with said transmission output shaft.

16. A change-speed transmission according to claim 15, wherein said gear set means includes three gear wheels with the gear wheel thereof providing the largest speed reduction being permanently operatively connected to said input means and wherein said drive means includes a gear wheel operatively connected with the last-mentioned one of the three gear wheels of said gear set means to provide the driving connection for said mowing drive.

17. A change-speed transmission according to claim 16, wherein said creeping speed includes selectively engageable speed reducing means operatively connected between the center one of said three gear wheels and said transmission output shaft.

18. A change-speed transmission according to claim 17, further comprising axially displaceable gear means on said countershaft for selective engagement thereof with the third of said three gear wheels or with said input means.

19. A change-speed transmission for a tractor having a transmission housing and adapted to provide a plurality of transmission ratios including a creeping speed, a mowing drive and separate output means, comprising input means, main change-speed gear means within said housing including transmission output means, means including gear set means for selectively connecting said input means with said change-speed gear means either directly or at a speed reduction over said gear set means, means for taking off the drive for said creeping speed and said mowing drive from said gear set means, and selectively engageable means for connecting said separate output means with said input means or with said transmission output means.

References Cited in the file of this patent

UNITED STATES PATENTS

| | | |
|---|---|---|
| 2,214,805 | Baker et al. | Sept. 17, 1940 |
| 2,347,352 | Lapsley | Apr. 25, 1944 |

FOREIGN PATENTS

| | | |
|---|---|---|
| 664,765 | Germany | Sept. 3, 1938 |